United States Patent

Schnepel

[15] 3,667,250
[45] June 6, 1972

[54] TORQUE RELEASE ADAPTER FOR POWER-OPERATED TOOLS

[72] Inventor: Lawrence S. Schnepel, 250 Goodman Hill Road, Sudbury, Mass. 01776

[22] Filed: Sept. 14, 1970

[21] Appl. No.: 71,805

[52] U.S. Cl. ..............................................64/29, 81/52.4 R
[51] Int. Cl. .........................................................F16d 7/06
[58] Field of Search ..................................64/29, 30; 81/52.4

[56] References Cited

UNITED STATES PATENTS

| | | | |
|---|---|---|---|
| 2,471,614 | 5/1949 | Gilman | 64/30 |
| 2,727,372 | 12/1955 | Haerther | 64/30 C |
| 3,287,935 | 11/1966 | Grunbaum | 64/30 |

*Primary Examiner*—Edward G. Favors
*Attorney*—Roberts, Cushman & Grover

[57] ABSTRACT

A torque release adapter comprising coaxially aligned shafts, opposed discs at the adjacent ends of the shafts having spaced parallel surfaces containing circumferentially spaced holes for receiving balls, an internally threaded receptacle integral with one shaft, said receptacle being concentric with the one shaft and an externally threaded cup nut non-rotatably mounted on the other shaft so as to be movable axially on said other shaft, said cap nut being threaded into the receptacle and, in conjunction therewith, providing a closed chamber of variable axial length and a plurality of opposed dished spring washers mounted on said other shaft in the chamber between the cap nut and the disc on said other shaft, said cap nut and receptacle being adapted by rotation of the shafts relative to each other to change the compression of the washers and hence the torque release limit.

7 Claims, 6 Drawing Figures

PATENTED JUN 6 1972  3,667,250
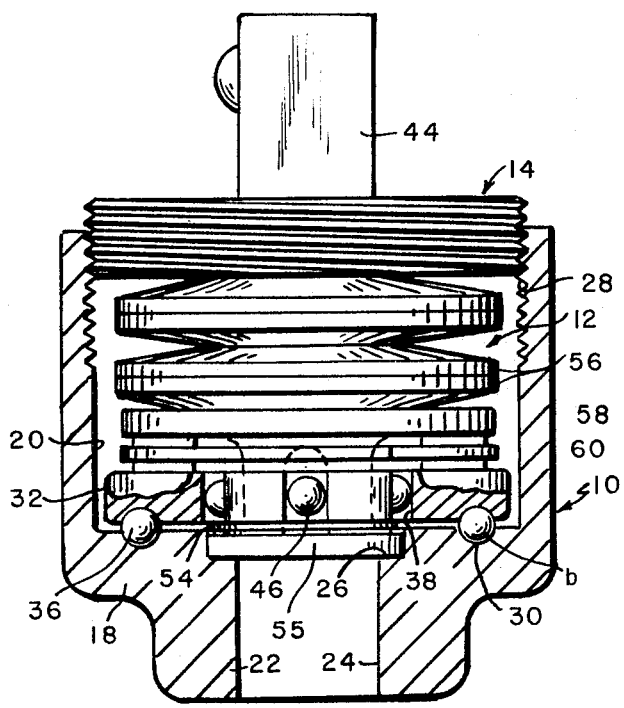
FIG.1
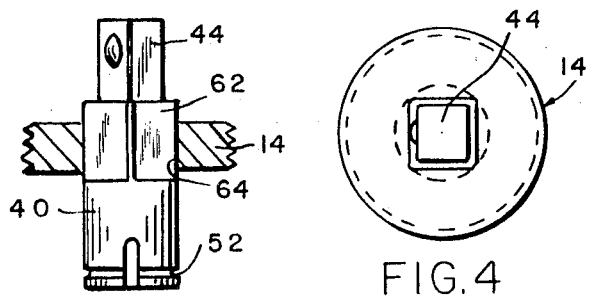
FIG.3    FIG.4
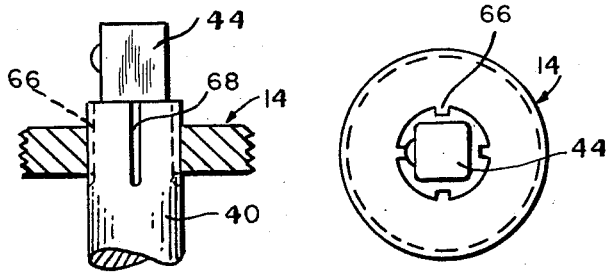
FIG.5    FIG.6
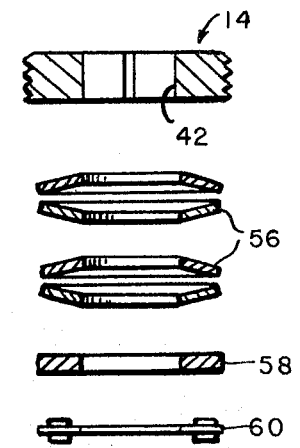
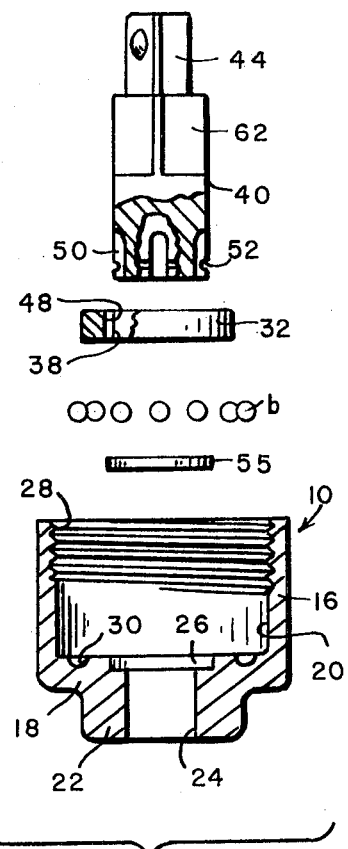
FIG.2
INVENTOR
LAWRENCE S. SCHNEPEL
BY Roberts, Cushman & Grover
ATTYS

TORQUE RELEASE ADAPTER FOR POWER-OPERATED TOOLS

BACKGROUND OF THE INVENTION

Torque limiting devices for limiting the torque which may be applied to tighten nuts, screws, bolts, and the like, are not new per se. Two such devices are disclosed in my pending U.S. applications Ser. No. 30,043, filed Apr. 20, 1970 and Ser. No. 64,409, filed Aug. 17, 1970.

The devices shown in these applications are primarily designed for hand tools in which the operating torque is applied by means of a hand lever. In each of the aforesaid devices there is means for adjusting the limiting torque at which release will take place and in each case when the adjustment is made a set screw is provided for fixing the adjusted position. For a hand tool in which the force is applied uniformly and unidirectionally a set screw suffices. It is desirable, however, to employ a device of this kind with a power tool, for example a pneumatic tool, such as shown in U.S. Pat. Nos. 3,020,789, 3,199,644 or 3,168,944. These power tools are illustrated as pneumatically operated, although they may be electrically operated and apply a rapid series of vibratory blows which, although not sufficient to exceed the torque provided at any instant, because of their vibratory character make it impossible to maintain the adapter at a predetermined position of adjustment by means of the set screw arrangement shown therein.

The present invention entails a redesign of the adapter to insure maintaining the position of adjustment at any time in spite of the vibration of the power tool by means of which the torque is applied.

SUMMARY

A torque release adapter for a power tool comprising shafts supported in coaxial alignment, a part on one shaft yieldably held engaged with a part on the other shaft, said parts being rotatable relative to each other when the torque exceeds a predetermined adjusted amount; characterized in that there is means for adjusting the torque at which rotation will take place, comprising a threaded part on the one shaft adapted to partake of the rotation of the one shaft relative to the other, and a threaded part on the other shaft with which the threaded part on the one shaft is interengaged, said threaded parts being operable by rotation of the shafts relative to each other to change the torque to a predetermined different torque. The threadably interengageable parts comprise a cap nut non-rotatably mounted on the one shaft and an internally threaded receptacle integral with the other shaft, said cap nut and receptacle, in conjunction, comprising a closed chamber adapted to contain the torque release components and being variably adjustable in axial length to change the pressure on said components. The cap nut is splined to the one shaft for rotation therewith and movable axially therealong.

The invention will now be described in greater detail with reference to the accompanying drawings wherein:

FIG. 1 is a diametrical section of the device;

FIG. 2 is an exploded view of the device showing the several components of which it is comprised, some in elevation and some in section;

FIG. 3 is a fragmentary elevation of the input shaft of the device in which is mounted the means for adjusting the torque;

FIG. 4 is a plan view of FIG. 3;

FIG. 5 is an elevation similar to FIG. 3 of an alternative construction; and

FIG. 6 is a plan view of FIG. 5.

Referring to the drawings, the torque release adapter comprises a receptacle 10 within which is mounted torque release mechanism 12. A closure cap nut 14 provided with threads for engagement with threads in the receptacle 10 supports the torque release mechanism 12 in the receptacle 10 and provides for adjustment of the torque which is to be transmitted to the adapter.

The receptacle 10 (FIG. 1) is of circular cross-section having a cylindrical side wall 16, closed at one end by an end wall 18 and open at the other end, and provides within the wall a cylindrical chamber 20. The end wall 18 has a portion 22 integral therewith and of reduced diameter which contains a centrally located opening 24 of non-circular configuration for receiving a tool or other implement for applying rotation thereto or for receiving a nut or other fastening to which a turning couple is to be applied through the adapter and comprises the output shaft. The opening 24 extends through the end wall 18 to the interior of the chamber 20, its axis coinciding with the axis of the chamber and its inner end is enlarged diametrically to provide a shallow recess 26. The open end of the receptacle is provided at its inner side with a thread 28. The inner side of the end wall 18, which comprises the bottom of the chamber 20, is flat and contains a plurality of recesses 30 arranged in a circle about the axis of the receptacle, close to the wall 16, the recesses being hemispherical in configuration for receiving ball bearings $b$. As illustrated, there are 12 such recesses spaced regularly about the axis of the receptacle. Within the receptacle there is mounted the torque release mechanism 12 which comprises a disc 32 corresponding substantially in diameter to the inside diameter of the receptacle but enough smaller to turn freely therein, which has at its lower side a plurality of recesses 36 corresponding in number to the recesses 30. The recesses 36 are located at the same radial distance from the axis of the disc and of the receptacle as are the recesses 30 from the axis of the receptacle.

In accordance with the aforesaid pending U.S. application Ser. No. 30,043, the disc 32 is fixed to a shaft 40 which extends axially therefrom through the open end of the receptacle through an opening 42 in the closure cap nut 14 and has at the outwardly projecting end thereof a non-circular reduced portion 44 for receiving an open end socket wrench, or the like, for applying a turning force to the shaft 40. Alternatively, as shown in U.S. application Ser. No. 64,409, and herein, the disc 32 contains a central opening 38 of relatively larger diameter than the shaft 40 and is mounted on the shaft 40 for rotation with the shaft by means of a plurality of balls 46 set into recesses 48 and 50, respectively, at the inner side of the disc 32 and the outer side of the shaft 40. The recesses 48 are semicircular in cross-section and of uniform depth from surface to surface of the disc and the recesses 50 are also semicircular in configuration and are elongate axially of the shaft 40 so as to permit axial movement of the disc relative to the shaft 40. At the lower end of the shaft there is a peripheral groove 52 for receiving a locking ring 54 which after the shaft is assembled with the disc will prevent the disc from slipping off the lower end of the shaft. As disclosed in both of the aforesaid devices a flat disc 55 is mounted in the recess 26 so that the lower end of the shaft 40 bears against it.

The amount of torque that can be transmitted before release is controlled by pairs of oppositely disposed dished spring washers 56 disposed about the shaft 40 between the lower side of the cap nut 14 and the upper side of a washer 58 and roller bearing assembly 60 mounted on the shaft next to the disc 32.

In the prior devices by turning the cap nut 14 in the receptacle 16 the effective axial length of the chamber 20 could be changed to apply or release compression of the dished washers and hence to change the pressure between the end wall 18 and the disc 32 which, in turn, controlled the release torque. In the aforesaid devices the adjustment of the cap nut was fixed by a set screw or its equivalent. Such was adequate when the adapter is used as a hand tool, that is, when a lever is employed for applying the torque and the force is applied uniformly without impact. It is desirable, however, to adapt this device to use with a power tool or hammer such as pneumatic and electric hammers by interposing the device between the power hammer and the part for applying the torque. The vibratory character of the power hammer is such that it is impossible to maintain a predetermined adjustment with a set screw. To insure permanence of adjustment and in accordance with the improvement herein illustrated, the shaft 44 and the closure cap nut 14 are non-rotatably splined to each other. This may be obtained, as shown in FIG. 3, by providing at the upper end of the shaft 44 a portion 62 of rectangular cross-section and providing the closure cap nut 14 with a central opening 64 of corresponding cross-section so that rotation of the shaft 40 imparts a corresponding rotation to the closure cap nut 14 and in turn prevents rotation of the closure cap nut relative thereto. As thus constructed, to apply an increased torque or to reduce the torque the shaft 44 is rotated to decrease the axial length of the chamber or to increase it and thereby to apply greater pressure to the washers or to relieve the pressure thereon. Preferably the opening 64 in the closure cap nut 14 is made slightly larger than the cross-section of the splined portion of the shaft so that there is a sufficient clearance between the two for the shaft 40 to rotate a limited angular distance without correspondingly rotating the closure cap nut. Since the torque is applied in the form of a series of short impacts without actually turning the shafts relative to each other, the closure cap nut remains in a predetermined position of adjustment while the shaft oscillates within it and at the same time the limited oscillation of the shaft 40 entirely prevents the closure cap nut from moving in either direction sufficiently to change the torque. Optionally, the shaft 40 and closure cap nut, as shown in FIGS. 5 and 6, may be provided with splines and grooves 66 and 68 for non-rotatably connecting the shaft 40 and closure cap nut.

As heretofore indicated, the improvement may be applied to either form of the device as disclosed in the aforesaid applications and enables use of the device with pneumatic or electric impact hammers for removing stubborn fastenings which will not respond to the ordinary manually operated tool.

It should be understood that the present disclosure is for the purpose of illustration only and that this invention includes all modifications and equivalents falling within the scope of the appended claims.

I claim:

1. A torque release adapter for a power tool comprising shafts supported in coaxial alignment, a part mounted on one shaft for free rotation thereon and for movement axially thereon, said part being spring-biased toward a fixed part on the other shaft for transmitting rotation applied to the one shaft to the other, said parts embodying circularly disposed, opposed recesses forming pockets, ball members disposed in said pockets, said parts being axially displaceable in proportion to the applied torque to allow a predetermined limited relative rotation of the parts without transfer of the ball members from said pockets to the preceding or succeeding pocket, means for adjusting the resistance of the parts to axial displacement and hence relative rotation comprising a threaded part non-rotatably mounted on one shaft adapted to partake of the rotation of the one shaft relative to the other, and a threaded part integral with the other shaft with which the threaded part on the one shaft is threadably interengaged, said threaded parts being operable by rotation of the one shaft relative to the other to transfer the ball members from the pockets in which they reside to the preceding or succeeding pockets to thereby decrease or increase the torque which will be transmitted.

2. A torque release adapter according to claim 1, wherein the threaded parts are, respectively, a cap nut non-rotatably mounted on the one shaft, said cap nut having an exterior thread, and a receptacle integral with the other shaft, said receptacle having an interior thread for interengagement with the cap nut.

3. A torque release adapter according to claim 2, wherein the cap nut and receptacle, in conjunction, comprise a closed housing defining an interior chamber in which are located the torque release components.

4. A torque release adapter according to claim 1, wherein the one shaft is of rectangular cross-section and wherein the threaded parts are, respectively, a cap nut containing a rectangular hole for engagement of the one shaft therewith whereby it partakes of the rotation of said one shaft, said cap nut having an external threaded portion and a receptacle integral with the other shaft having a thread interior thereof for threaded engagement with the cap nut.

5. A torque release adapter according to claim 2, wherein the cap nut is movable axially on the one shaft by rotation of the shafts to change the resistance to relative rotation of the parts.

6. A torque release adapter according to claim 2, wherein splines non-rotatably connect the cap nut to the one shaft.

7. A torque release adapter according to claim 2, wherein the cap nut contains a hole of relatively larger cross-section than the cross-section of the one shaft such that there is an appreciable clearance therebetween permitting a limited amount of rotation of the one shaft within the cap nut.

* * * * *

UNITED STATES PATENT OFFICE
CERTIFICATE OF CORRECTION

Patent No. 3,667,250      Dated June 6, 1972

Inventor(s) Lawrence S. Schnepel

It is certified that error appears in the above-identified patent and that said Letters Patent are hereby corrected as shown below:

Column 3, line 41, "thereon" should read -- therewith --.

Signed and Sealed this

Eighth Day of February 1977

[SEAL]

Attest:

RUTH C. MASON
*Attesting Officer*

C. MARSHALL DANN
*Commissioner of Patents and Trademarks*